United States Patent [19]

Efner

[11] Patent Number: 5,028,649

[45] Date of Patent: Jul. 2, 1991

[54] POLYETHYLENE TEREPHTHALATE MOLDING COMPOUNDS WITH SODIUM STEARATE AND POLYESTER AMIDES

[75] Inventor: Howard F. Efner, Bartlesville, Okla.

[73] Assignee: Phillips Petroleum Company, Bartlesville, Okla.

[21] Appl. No.: 542,361

[22] Filed: Jun. 22, 1990

[51] Int. Cl.[5] .......................... C08K 7/14; C08K 7/00; C08K 5/09

[52] U.S. Cl. .................................... 524/394; 524/494; 524/513; 524/538

[58] Field of Search ................ 524/394, 513, 538, 494

[56] References Cited

U.S. PATENT DOCUMENTS

| | | | |
|---|---|---|---|
| 4,129,715 | 12/1978 | Chen et al. | 528/67 |
| 4,447,572 | 5/1984 | Scharf et al. | 524/371 |
| 4,528,346 | 7/1985 | Sugie et al. | 525/523 |
| 4,547,547 | 10/1985 | Chen et al. | 524/538 |

*Primary Examiner*—Lewis T. Jacobs
*Attorney, Agent, or Firm*—Archie Robbins; Morrison Bennett

[57] ABSTRACT

Reinforced polyethylene terephthalate molding resin compounds with a glossy surface are provided which crystallize rapidly after being injection molded and which have engineering resin performance characteristics. In addition to polyethylene terephthalate and glass fibers, the compounds contain an aliphatic polyester, an ionic hydrocarbon polymer, an antioxidant, sodium stearate and polyester amide resin. Optionally, the compounds may contain a portion of glass flakes, mica or other filler. The compounds can be flame retarded with a brominated polystyrene and an antimonate without substantial loss of, or change in, properties.

44 Claims, 2 Drawing Sheets

POLYETHYLENE TEREPHTHALATE MOLDING COMPOUNDS WITH SODIUM STEARATE AND POLYESTER AMIDES

BACKGROUND OF THE INVENTION

This invention is in the field of glass fiber reinforced polyethylene terephthalate molding compounds.

Polyethylene terephthalate molding compounds which are reinforced with glass fibers, asbestos fibers, or other fibrous mineral material are known to either crystallize slowly and give a resin rich surface which gives a good surface finish but inferior mechanical properties and slow molding cycles, or rapidly crystallize, giving good mechanical properties and short molding cycles but leave a filler (glass) rich surface which has low gloss. One method of improving surface finish is to increase the mold temperature but this can result in longer cooling times. It is also known that molding undried polyethylene terephthalate produces parts with good gloss but poor mechanical properties.

It is difficult to get fiber reinforced polyethylene terephthalate molding compounds to display a combination of optimized surface finish characteristics, rapid crystallization, and acceptably high, from a commercial viewpoint, thermal and mechanical properties. Processability, shorter cycle times and better flow properties are important. Thus, even when a particular polyethylene terephthalate molding compound displays both good surface finish characteristics and, after injection molding, some good strength characteristics, it may not be suitable for use in many molding resin compound applications, because it does not also possess other commercially required characteristics. For example, for use in so called engineering resin applications, a glass fiber reinforced polyethylene terephthalate molding compound needs to have attractive surface appearance, good spiral flow, rapid crystallization, high heat distortion temperature, and an ability to produce a molded part which has a smooth, glossy surface and minimal warpage after the part is removed from a mold.

There is a need for reinforced polyethylene terephthalate molding compounds with high surface gloss which also have engineering resin performance characteristics. Also, there is a need for compounds of this type which display high flow rates under molding conditions without water addition and without lubricant addition. In addition, these compounds should also be capable of having a flame retardant material added thereto in an amount effective for achieving flame retardancy without a significant or commercially unacceptable loss of properties.

SUMMARY OF THE INVENTION

An object of the present invention is to provide a new and improved class of glass fiber reinforced polyethylene terephthalate compositions which have an excellent combination of good surface finish, rapid crystallization, good processability, physical strength, good flow rates, and high heat distortion temperatures.

Another object is to provide such a composition which can be easily and reliably prepared by melt extrusion.

Another object is to provide a fiber glass reinforced polyethylene terephthalate molding composition which has good surface finish and engineering resin performance characteristics, which is rapidly crystallizable, and which has outstandingly high flow rates under molding conditions.

Another object is to provide such a composition which can be molded by a conventional procedure with conventional equipment and still obtain engineering resin performance characteristics with rapid crystallization and good surface finish.

Another object is to provide such a composition which can be flame retarded through the addition thereto of further additives which when so added do not cause a significant reduction in desired properties.

Another object is to provide processes for making and using such a flame retarded composition.

In accordance with this invention, a molding composition comprises:

(a) polyethylene terephthalate;

(b) filler;

(c) an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;

(d) a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium; and (e) an antioxidant;

(f) sodium stearate;

(g) a polyester amide resin chacterized by a recurring unit of the formula:

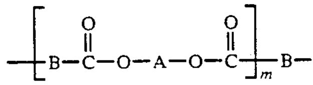

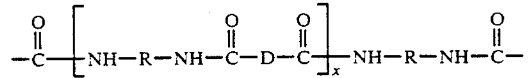

wherein R is selected from the class consisting of arylene of the formulae:

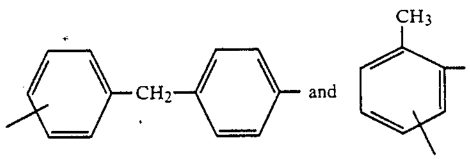

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10.

Optionally, the inventive compounds may be flame retarded.

BRIEF DESCRIPTION OF THE DRAWINGS

In the drawings which form a part hereof,

FIGS. 1 and 3 are scanning electron microscope photomicrographs, 100× magnification, of the surface of objects molded from two of the compounds of this invention.

FIGS. 2 and 4 are scanning electron microscope photomicrographs, 100× magnification, of the surface of objects molded from two of the control compounds used in evaluating this invention.

DETAILED DESCRIPTION OF THE INVENTION

The present invention is directed to a class of new and very useful molding compounds of glass fiber reinforced polyethylene terephthalate which has a surprising and unexpectedly good surface finish as well as a high flow rate under molding conditions, a rapid crystallization rate after being injection molded, and acceptable engineering resin performance characteristics, such as good physical strength and high heat distortion temperature.

A good surface finish, among other advantages, is useful for the fabrication of parts where visual appearance is important, such as exterior automotive, motorcycle, bicycle, appliance and furniture parts.

Among other advantages, a high-molding flow rate permits an injected resin to fill all cavities of an intricate mold, as those skilled in the art will readily appreciate. A blended, melt extruded, pelletized composition of this invention can be conventionally injection molded, for example, using an injection molding temperature with range from about 520° to 580° F. into molds typically ranging in surface temperature from about 180° to about 280° F.

In addition, the molding compounds of this invention retain to an unexpected and remarkable extent an acceptable combination of performance characteristics when a selected class of polyester amide elastomers and sodium stearate are included in the compound. This achievement with such polyester amide elastomers and sodium stearate is particularly unexpected because at the low levels employed, neither component by itself gives the improvement in surface finish that the combination of the two components produces. This is also accomplished without causing a significant and unacceptable deterioration of the polyethylene terephthalate matrix resin.

Although the molding compounds of this invention use a plurality of additives in combination with polyethylene terephthalate, these additives coact with each other and with the polyethylene terephthalate as demonstrated by the circumstance that the above indicated desired combination of engineering resin performance characteristics is not achieved unless all such components are present within the respective quantity ranges disclosed in this application.

More particularly, the molding resin compounds of this invention are compositions comprising:

(a) from about 30 to about 90 weight percent, more preferably from about 35 to about 65, based on total weight of the compound, of polyethylene terephthalate having an intrinsic viscosity of at least about 0.25;

(b) from about 5 to about 65 weight percent, more preferably from about 10 to 60 weight percent, based on total weight of the compound, of glass fibers having an average cross-sectional thickness in the range from about 7 to about 15 microns and an average length in the range from about 2 to about 8 millimeters;

(c) from about 0.5 to about 15 pph resin, more preferably from about 2.5 to about 10 pph resin, of an aliphatic polyester having a number average molecular weight ranging from about 7,500 to about 20,000 and which is a condensation product of an alkanedioic acid containing from about 8 to about 12 carbon atoms per molecule and an alkanediol containing from 2 to about 5 carbon atoms per molecule;

(d) from about 0.1 to about 3 pph resin, more preferably 0.2 to about 1.2 pph resin, of a metal salt of an ionic hydrocarbon copolymer of an alpha-olefin containing from 2 to 5 carbon atoms per molecule and an alpha, beta-ethenically unsaturated carboxylic acid containing from about 3 to about 5 carbon atoms per molecule in which copolymer the carboxyl groups have been at least partially neutralized with cations of said metal, said polymer having a molecular weight before such neutralization of at least about 3,000, said metal being selected from the group consisting of sodium and potassium;

(e) from about 0.01 to about 2 pph resin, more preferably from about 0.2 to about 1.0 pph resin, of an antioxidant;

(f) from about 0.01 to about 1 pph resin, more preferably from about 0.1 to about 0.5 pph resin, of sodium stearate; and (g) from about 0.1 to about 5 pph resin, more preferably from about 0.5 to about 2 pph resin, of a polyester amide resin characterized by a recurring unit of the formula:

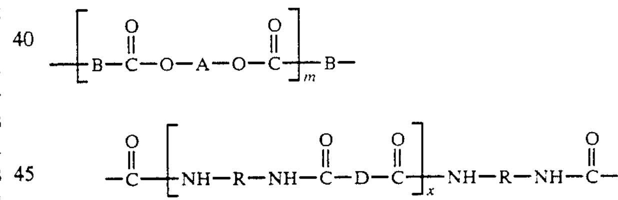

wherein R is selected from the class consisting of arylene of the formulae:

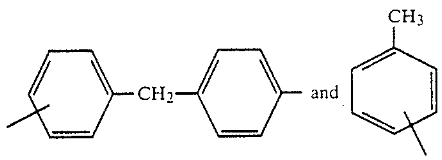

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10.

By "pph resin" as used herein is meant the parts by weight per 100 parts by weight of polyethylene terephthalate.

To flame retard a compound of this invention, one can admix therewith from greater than 0 to about 20 weight percent, of a composition consisting essentially of:

(a) brominated polystyrene having a number average molecular weight ranging from about 10,000 to about 400,000, and having a bromine content in the range from about 55 to about 75 weight percent (based on total weight of the brominated polystyrene), and (b) antimonate of at least one metal selected from Group I, Group II, and Group VII of the Periodic Table; wherein the weight ratio of said brominated polystyrene to said antimonate ranges from about 2:1 to about 12:1, and more preferably, from about 3:1 to about 10:1.

Other flame retardants are also contemplated as useful in this invention.

The Polyethylene Terephthalate

The polyethylene terephthalate employed herein has an inherent viscosity of at least about 0.25, preferably about 0.4 as measured by ASTM D-2857. The polyethylene terephthalate perferably has an upper limit on inherent viscosity of about 1.2. Inherent viscosity is measured in a 3:1 volume ratio of methylene chloride and trifluoracetic acid at 30° C. The polyethylene terephthalate can optionally contain up to 50 percent by weight of other comonomers, such as diethylene glycol, glutaric acid, polybutylene terephthalate, polyalkylene oxide, cyclohexane dimethanol, and other diols. Mixtures of polyethylene terephthalate resins can be used. Suitable polyethylene terephthalate polymers are commercially available.

Fillers

Conventional fillers known in the art can be used. Examples of non-fibrous, inorganic fillers include clay, mica, talc, kaolin, calcium carbonate, barytes, ceramic spheres, glass spheres, glass flakes, calcium silicate, and the like. Mixtures of two or more non-fibrous inorganic fillers can be used.

Examples of non-fibrous organic fillers include wood and shell flours, starches, carbohydrate by-products, synthetic organics, such as polyvinylidene dichloride spheres, and the like. Mixtures of two or more non-fibrous ogranic fillers can be used.

Examples of metal powders, flakes, or fibers include aluminum, bronze, zinc, nickel, stainless steel, and the like. Mixtures of one or more metal powders can be used. Oxides of metals such as titanium dioxide, zinc oxide, zinc sulfide and the like are also contemplated as useful. Mixtures of two or more metal oxides can be used. Also, mixtures of metals and metal oxides can be used.

Examples of fibrous fillers include those comprised of aramid, carbon, glass, hybrids (such as aramid/carbon, aramid/carbon/glass, aramid/glass, carbon/glass, and the like), boron, ceramic, metal, Wollastonite, mixtures thereof and the like.

Mixtures of organic and inorganic fillers can be used. Also useful are mixtures of fibrous and non-fibrous fillers, including such combinations as glass fibers and glass flakes, glass fibers and mica, glass fibers and Wollastonite, glass fibers and glass spheres, and the like. Metal fillers, metal oxide fillers and mixtures of these can be combined with other fibrous or non-fibrous fillers or with other organic or inorganic fillers or with various mixtures of fillers from these categories.

The glass fibers presently preferred have an average cross-sectional thickness in the range from about 7 to 15 microns, preferably from about 8 to about 10 microns and an average length in the range from about 2 to about 8 millimeters, preferably from about 2.5 to about 5 millimeters. Such glass fibers are commercially available.

The Aliphatic Polyester

The aliphatic polyesters have a number average molecular weight in the range from about 7,500 to about 20,000, preferably about 8,000 to about 10,000 which is a condensation product of an alkanedioic acid containing from about 8 to 12 carbon atoms per molecule and an alkanediol containing from about 2 to about 5 carbon atoms per molecule. Preferred alkanedioic acid comonomers for such polyesters contain 8 to 10 carbon atoms per molecule and preferred alkanediol comonomers for such polyesters contain 3 to 4 carbon atoms per molecule. One presently most preferred such polyester is a condensation product of sebacic acid with 1,2 propanediol. Characteristically, the aliphatic polyester is in the physical form of a liquid at ambient conditions. It is believed that the polyester reacts with the resin matrix during extrusion processing conditions.

The Ionic Hydrocarbon Copolymer

The ionic hydrocarbon copolymer contemplated as useful is a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of the metal with the copolymer having a number average molecular weight in excess of about 3,000 prior to neutralization, and with the metal being selected from the group consisting of sodium and potassium.

Representatives of the ionic hydrocarbon copolymer are sodium and/or potassium salts of copolymers of such olefins (especially ethylene) with acrylic acid, methacrylic acid, or mixtures thereof which are at least about 30 percent neutralized. Suitable polymers are commercially available.

The polyester and the ionic hydrocarbon copolymer (also known as ethylene acid copolymer or ionomer) are believed to cooperate with one another in a synergistic manner when in combination with polyethylene terephthalate to induce rapid crystallization of the polyethylene terephthalate when such combination is melt injected into a mold having a surface temperature at about or under 110° C., and to result in good molded product properties. Typical crystallization times with such a mold temperature are characteristically not more than about 30 seconds.

The Antioxidant

Many different antioxidants can be used. In general, preferred antioxidants are thermally stable at the processing temperature employed. Hindered phenol antioxidants are presently preferred. The antioxidant which is presently most preferred is available from Ciba-Geigy Corporation as "Irganox 1010", the active component of which is believed to be tetrakis (methylene 3-[3,5-dit-butyl-4-hydroxyphenyl] propionate) methane. Other suitable antioxidants include:

(A) Borg Warner's "Ultranox 626", the active agent of which is bis[2,4-di-t-butyl phenyl pentaerythritol] diphosphite;

(B) Ciba-Geigy's "Irganox 259" the active agent of which is 1,6-hexamethylene bis(3,5-di-t-butyl-4-hydroxy-hydrocinnamate) and/or 1,6-hexamethylene bis(3-[3,5-di-t-butyl-4-hydroxyphenyl]- propionate);

(C) Ferro Corporation's "OXI-Chek 116", the active agent of which is octadecyl 3,5-di-t-butyl-4-hydroxyhydrocinnamate; and (D) Ciba-Geigy's "Irganox 1098", the active agent of which is N,N'-hexamethylene *bis*[3,5-di-t-butyl-4-hydroxyhydrocinnamide].

The Sodium Stearate

The sodium stearate contemplated as useful herein is a salt of stearic acid. Sodium stearate is available commercially, usually in the form of a powder or in pellets.

The Polyester Amide

The polyester amides which can be employed herein are substantially linear, segmented thermoplastic elastomers. These elastomers contain both hard segments of semicrystalline polyamide and elastomeric soft segments of polyester and possess sufficiently low melt properties to be injection moldable. Polyester amides contemplated as useful in this invention are those which are characterized by a recurring unit of the formula:

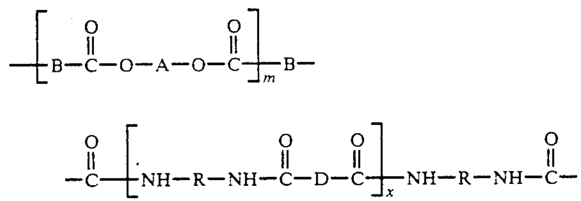

wherein R is selected from the class consisting of arylene of the formulae:

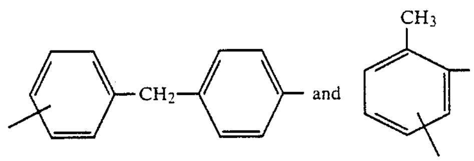

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10. Applicable polyester amides are described in U.S. Pat. No. 4,129,715 (Chen, Dec. 12, 1978), the disclosure of which is hereby incorporated by reference.

The Brominated Polystyrene

Preferably, the bromine content is at least about 60 weight percent of such polymer. Preferably, such polymer has a number average molecular weight ranging from about 10,000 to about 400,000, preferably about 225,000 to about 350,000. Such brominated polystyrene is available commercially.

For purposes of achieving flame retardancy, the combined weight of the brominated polystyrene and the antimonate (see below) in a resin blend is preferably at least about 4 weight percent of the total resin blend. A presently preferred weight ratio of brominated polystyrene to antimonate compound(s) is from about 3:1 to about 10:1.

The Antimonate

A presently particularly preferred antimonate is sodium antimonate although zinc antimonate and nickel antimonate and mixtures thereof are also preferred. The antimonate is usually employed in a finely-divided particulate or powder form.

Other Additives

In addition to the components discussed herein, the compounds of the invention may contain other additives commonly employed (and in the quantities known to the art) with polyethylene terephthalate. Examples include colorants, mold release agents such as low molecular weight polyethylene wax, tougheners including but not limited to commercially available epoxy compounds which are bisphenol-A/Epichlorohydrin condensation products, heat and ultraviolet light stabilizers, and the like. Usually, the total quantity of such other additives is not more than about 20 weight percent of the total weight of ingredients (a) through (g) listed above, although higher amounts could be used if desired.

Preparation

The compound compositions are prepared by blending together the components by any convenient means. For example, dry polyethylene terephthalate can be dry mixed in any suitable blender or tumbling means with the other components and the resulting mixture melt-extruded. Alternatively, all components except the glass or other filler can be mixed by conventional means and the glass or other filler then added to the already melted resin mixture. Preferably, the polyethylene terephthalate is preblended with the glass fibers and then this mixture is itself dry mixed with the other additives before melt-extrusion. A convenient melt extrusion temperature ranges from about 520° to 580° F. The extrudate is preferably in a strand form which can be chopped into pellets or the like as desired.

Composition

The molding resin compound compositions of this invention are summarized by the following Table 1:

TABLE 1

| Component | Quantity | |
|---|---|---|
| | Broad Range | Preferred Range |
| Polyethylene Terephthalate, wt %[a] | 30-90 | 35-65 |
| Glass Fibers, wt %[a] | 5-65 | 10-60 |
| Aliphatic Polyester, pph resin | 0.5-15 | 2.5-10 |
| Ionic Hydrocarbon Co-polymer, pph resin | 0.1-3 | 0.2-1.2 |
| Antioxidant, pph resin | 0.01-2 | 0.2-1.0 |
| Sodium Stearate, pph resin | 0.01-1 | 0.1-0.5 |
| Polyester Amide Resin, pph resin | 0.1-5 | 0.5-2 |

TABLE 1-continued

| Component | Quantity | |
|---|---|---|
| | Broad Range | Preferred Range |
| Flame Retardant[b], pph resin | 10-50 | 25-35 |
| Other Additives[b], wt % | 0-20 | |

[a]Based on total weight of the composition.
[b]Optional.

EXAMPLES

The following examples will be used to describe the invention and should be taken as illustrative and not restrictive.

Components

Runs were made using the various combinations and amounts of ingredients shown in the following Table 2.

Compounding

The polyethylene terephthalate resin was vacuum dried for about 16 hours at 250° F. prior to compounding. Other dessicant or dehumidifing drying methods are acceptable. The dry resin was removed from the drying oven, then quickly tumble blended with the other ingredients prior to compounding in a 1.5 inch 24:1 l/d Davis Standard extruder equipped with a single stage mixing screw and strand die. The melt temperature range was about 520° to 540° F. The mixture was either flood fed or metered to the extruder using a volumetric feeder. A nitrogen blanket was used to protect the polyethylene terephthalate resin from moisture absorption in the feeder or hopper. The extruded strands were briefly quenched in a water bath, allowed to dry using latent heat, and pelletized into approximately ⅛ inch pellets.

Molding

The pelletized compounds were dried overnight in a dehumidifing oven at 225° F. prior to injection molding. Test specimens were molded in standard molds on a 55-ton hydraulic clamp 2.9 ounce injection molding press, with a mold surface temperature of about 235° F. and a cylinder temperature of about 540° F. The dry molding compound was protected from moisture by a dry nitrogen blanket on the machine hopper. A fast injection speed was used with about 5-second injection time, about 4-second hold time, and about 25-second cooling time. Injection pressure was adjusted for molding filling. Holding pressure was about 80% of injection pressure.

Property Testing

Results of tests of properties of the compounds of each of nineteen experimental runs and eight control compounds are shown in Tables 2, 3, 4 and 5.

Spiral flow measurements were done on a 0.250 in.×0.060 in. spiral flow mold in a 55-ton injection molding machine. Mold surface temperature was about 235° F. and melt temperature was about 540° F. A fast injection speed was used with an injection time of about 5 seconds, no hold time, and about 17 seconds cooling time. The average flow length of 10 parts was taken after the machine had stabilized. Measurements were taken at hydraulic pressures of about 500, 1000, and 1500 psi which corresponded to injection pressures of about 6,750, 13,500, and 20,250 psi.

Relative part warpage was estimated by visual observation of the flatness of a 2½ in. diameter by 1/16 in. thick impact disc molded under the standard conditions described above.

Surface appearance was visually rated on test parts molded under the conditions described above. Scanning electron microscope photomicrographs with a 100× magnification were made of the surfaces of parts molded from two of the inventive compounds and from two control compounds. Surface appearance ranged from dull to glossy.

TABLE 2

Polyester Amides and Sodium Stearate as Additives in Polyethylene Terephthalate

| | Control A | Control B[a] | Run 1 | Run 2 | Run 3 | Run 4 | Run 5 | Run 6 |
|---|---|---|---|---|---|---|---|---|
| Ingredients | | | | | | | | |
| Polyethylene Terephthalate,[c] wt. %[d] | 59.6 | | 63.9 | 63.6 | 62.8 | 64.1 | 63.8 | 63.5 |
| Glass Fiber, wt. % | 35 | | 30[e] | 30[e] | 30[e] | 30[e] | 30[e] | 30[e] |
| Aliphatic Polyester,[h] wt. % | 4.2 | | 4.6 | 4.6 | 4.4 | 4.6 | 4.6 | 4.6 |
| Ionic Hydrocarbon Copolymer,[i] wt. % | 0.6 | | 0.6 | 0.6 | 0.6 | 0.6 | 0.6 | 0.6 |
| Antioxidant,[j] wt. % | 0.6 | | 0.6 | 0.6 | 0.6 | 0.6 | 0.6 | 0.6 |
| Polyester Amide,[k] wt. % | | | 0.3 | 0.6 | 1.6 | 0 | 0.3 | 0.6 |
| Sodium Stearate,[l] wt. % | | | 0 | 0 | 0 | 0.1 | 0.1 | 0.1 |
| Physical Properties | | | | | | | | |
| Flex Modulus, MSI | 1.6 | 2.1 | 1.4 | 1.4 | 1.4 | 1.3 | 1.3 | 1.3 |
| Flex Strength, MSI | 35.4 | 22 | 32.6 | 31.9 | 31.7 | 31.0 | 31.1 | 30.9 |
| Tensile Break, KSI | 23.0 | 13.8 | 20.0 | 20.0 | 20.2 | 20.3 | 20.5 | 20.6 |
| Percent elongation | 5.2 | 0.6 | 5.1 | 5.1 | 5.3 | 5.2 | 5.3 | 5.3 |
| Notched Izod, ft.lb./in. | 1.7 | 0.8 | 1.6 | 1.6 | 1.5 | 1.6 | 1.5 | 1.6 |
| Unnotched Izod, ft.lb./in. | 19.2 | | 19 | 19 | 19 | 17 | 17 | 18 |
| Melt Flow, 275° C., 5 kg | 27 | 44 | 66 | 74 | 76 | 69 | 84 | 85 |
| Color | off white | off white | lt. tan | lt. tan | lt. tan | lt. tan | lt. tan | lt. tan |
| Surface | slightly dull | slightly dull | slightly dull | very slightly dull | very slightly dull | very slightly dull | glossy | glossy |

| | Run 7 | Run 8 | Run 9 | Control C | Control D[b] | Run 10 | Control E |
|---|---|---|---|---|---|---|---|
| Ingredients | | | | | | | |
| Polyethylene terephthalate,[c] wt. %[d] | 62.7 | 39.8 | 39.8 | 40.3 | | 41.2 | 41.7 |
| Glass Fiber, wt. % | 30[e] | 55[f] | 55[g] | 55[f] | | 55[f] | 55[f] |
| Aliphatic Polyester,[h] wt. % | 4.4 | 2.9 | 2.9 | 2.9 | | 2.9 | 2.9 |
| Ionic Hydrocarbon Copolymer,[i] wt. % | 0.6 | 0.4 | 0.4 | 0.4 | | 0.2 | 0.2 |
| Antioxidant,[j] wt. % | 0.6 | 0.4 | 0.4 | 0.4 | | 0.2 | 0.2 |
| Polyester Amide,[k] wt. % | 1.6 | 0.4 | 0.4 | | | 0.4 | |

TABLE 2-continued

| Polyester Amides and Sodium Stearate as Additives in Polyethylene Terephthalate | | | | | | | |
|---|---|---|---|---|---|---|---|
| Sodium Stearate,[l] wt. % | 0.1 | 0.1 | 0.1 | | | 0.1 | |
| Color Concentrate,[m] wt. % | | 1.0 | 1.0 | 1.0 | | | |
| Physical Properties | | | | | | | |
| Flexural Modulus, MSI | 1.4 | 2.4 | 2.6 | 2.5 | 2.4 | 2.7 | 2.6 |
| Flexural Strength, MSI | 31.7 | 36.0 | 38.1 | 36.2 | 39.4 | 40.6 | 40.5 |
| Tensile Break, KSI | 20.2 | 24.3 | 24.7 | 23.6 | 24.8 | 27.0 | 26.8 |
| Percent elongation | 5.2 | 3.6 | 3.5 | 3.2 | 3.6 | 3.4 | 3.6 |
| Notched Izod, ft.lb./in. | 1.6 | | | | | | |
| Unnotched Izod, ft.lb./in. | 17 | | | | | | |
| Melt Flow, 275° C., 5 kg | 74 | | | | | | |
| Color | lt. tan | black | black | black | black | lt. tan | lt. tan |
| Surface | glossy | | | | | glossy | very slightly dull |

Notes for Table 2

[a]Rynite TM FR946, a polyethylene terephthalate compound commercially available from DuPont. It was not analyzed for content.
[b]Rynite TM 555, a polyethylene terephthalate compound commercially available from DuPont. It was not analyzed for content.
[c]Polyethylene terephthalate resin having an inherent viscosity of about 0.6 was used.
[d]Weight percents are based on total weight of the compound.
[e]Glass fiber commercially available from Owens-Corning as 492AA glass.
[f]Glass fiber commercially available from Certainteed as 993 glass.
[g]Glass fiber commercialy available from Certainteed as 93B glass.
[h]Paraplex TM G-25, a polyester sebacate, commercially available from C. P. Hall.
[i]Forminon TM 105 commercially available from A. Schulman, Inc.
[j]Irganox TM 1010 commercially available from Ciba-Geigy was used.
[k]The polyester amide was obtained from the Dow Chemical Company under the developmental number XUS 63115.
[l]The sodium stearate grade T-1 was obtained from the Humko Chemical Division of Witco Corporation.
[m]21% carbon black color concentrate for polyethylene terephthalate, commercially available from Reed Plastics as CPET 01333.

Comparative runs 1, 2 and 3 shown on Table 2 above demonstrate that use of polyester amide as an additive without using sodium stearate does not result in products with a glossy surface. Run 4 demonstrates that use of sodium stearate without using the polyester amide also does not result in products with a glossy surface.

Comparative runs 5, 6 and 7 shown in Table 2 demonstrate that adding the combination of polyester amide and sodium stearate unexpectedly gives glossy parts without decreasing mechanical properties such as tensile and flexural strength and impact resistance. The slightly higher melt flow obtained by adding the combination of polyester amide and sodium stearate may be within experimental error.

Figures 1, 2:
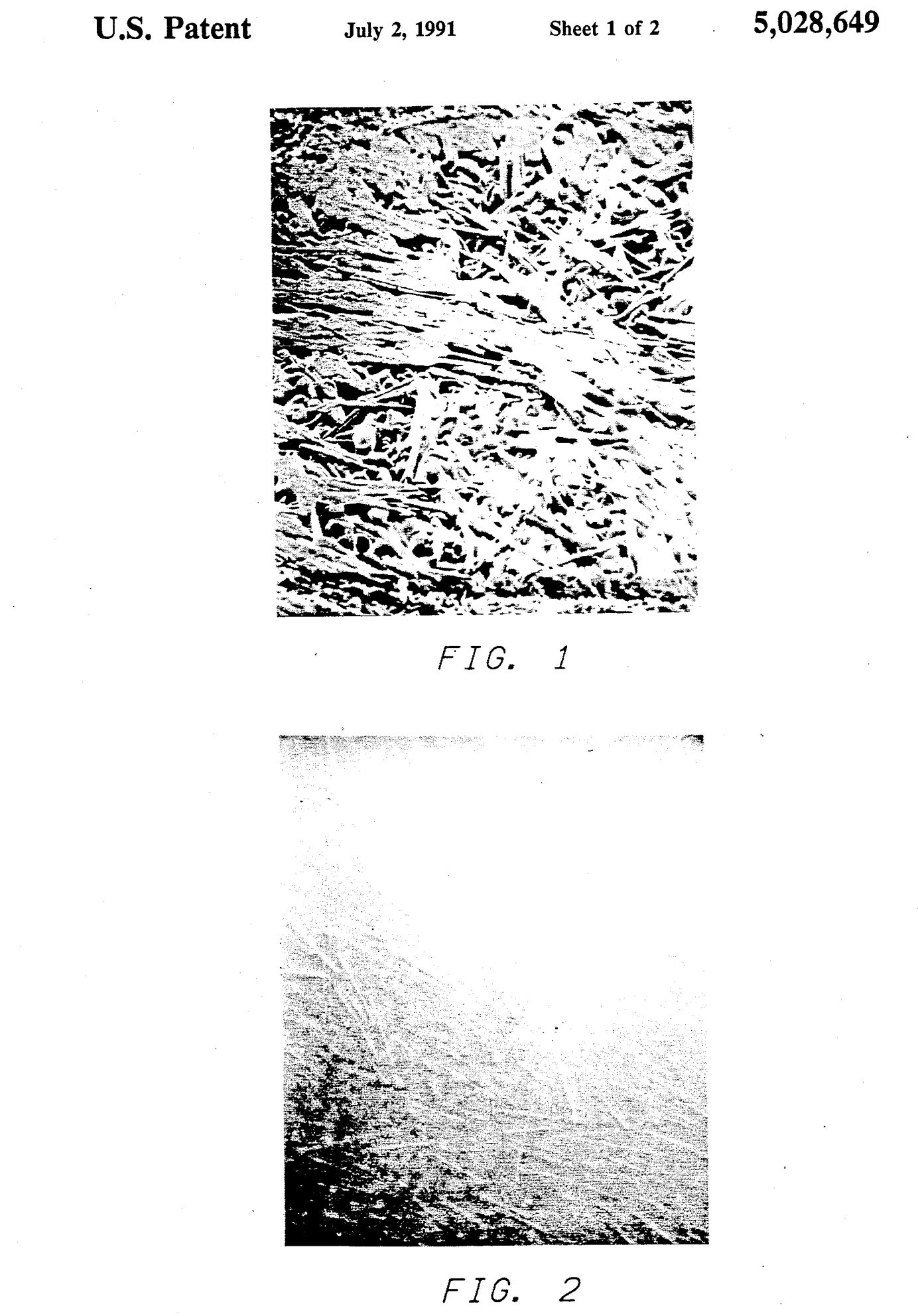

Comparative run 8 in Table 2 shows that a resin rich surface is produced by addition of polyester amide and sodium stearate to a polyethylene terephthalate compound reinforced with 55 weight percent Certainteed 993 glass fibers. FIG. 1 shows a 100× magnification scanning electron microscope photomicrograph of the surface of a part molded from the compound of this run. Control run C was done with the same glass fiber reinforcement without the polyester amide and sodium stearate. FIG. 2 shows a 100× magnification scanning electron microscope photomicrograph of the surface of a part molded from the compound of control run C taken at a 45° angle.

Figures 3, 4:
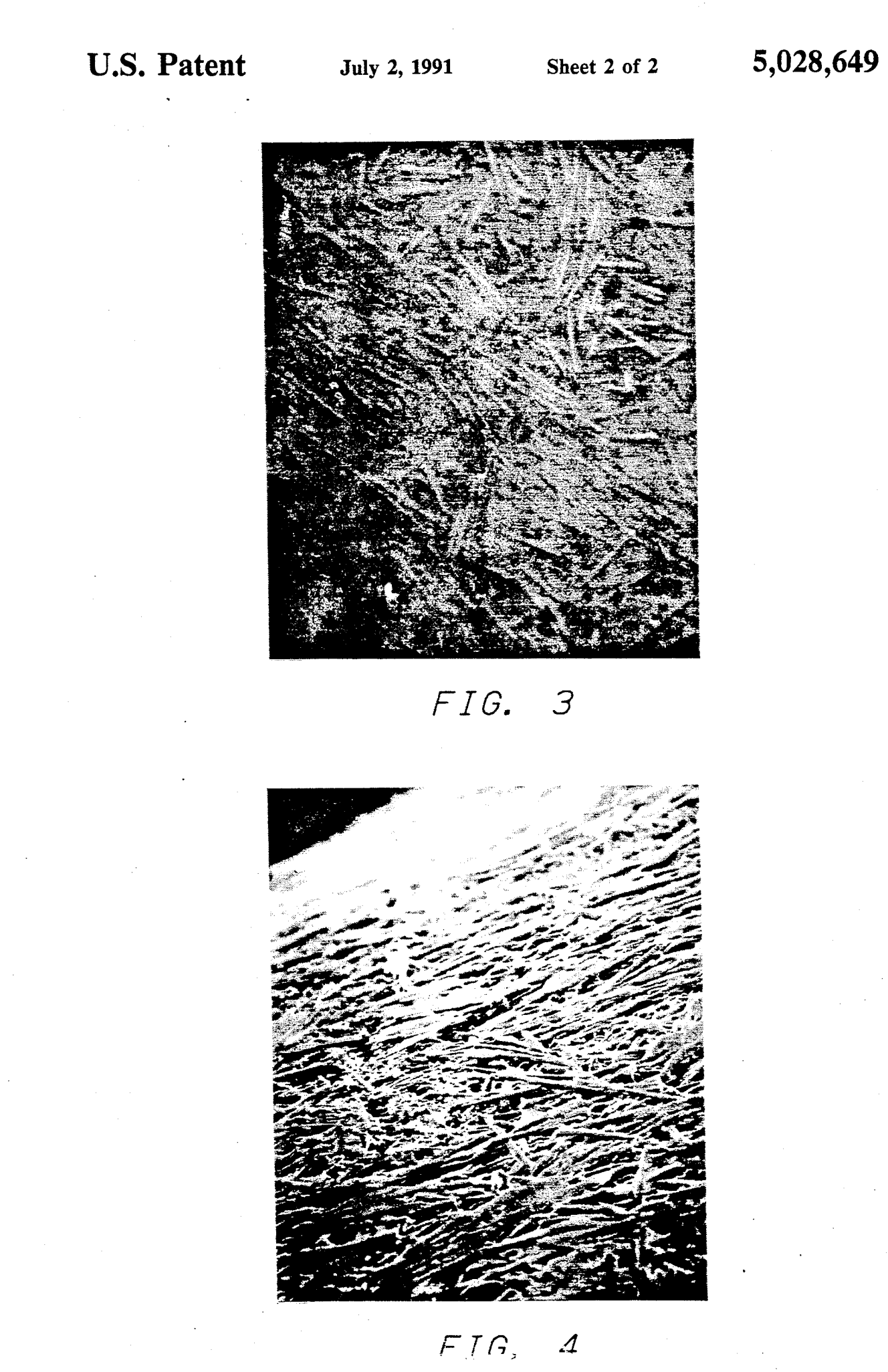

Comparative run 9 shown in Table 2 was made using the same formulation as run 8 except that Certainteed 93B glass was used. It is believed that the difference is processing of the glass resulted in better wetting and hence the improved flex strength of the run 9 compound as compared to the run 8 and control run C compounds. FIG. 3 is a 100× magnification scanning electron microscope photomicrograph of the surface of a part molded from the compound of run 9. FIG. 4 is a 100× magnification scanning electron microscope photomicrograph of control D which is Rynite TM 555, commercially available from Dupont.

The mechanical properties of runs 8 and 9 compared with control runs C and D, respectively, show mechanical properties to be substantially unchanged by the polyester amide and sodium stearate addition. The increase in flexural strength in run 9 is believed attributable to the difference in glass filler used. While not wishing to be bound by theory, applicant believes that the processing methods used in cutting the 93B glass results in glass fibers in arrangements which give better dispersion and wet out than is obtained when the 993 glass is used.

Run 10 shown in Table 2 compared with control E (Table 2) shows that surface appearance is improved while mechanical properties are similar when polyester amide and sodium stearate are added to the polyethylene terephthalate compound.

TABLE 3

| Polyethylene Terephthalate Compounds with Flame Retardants | | | | |
|---|---|---|---|---|
| | Run 1[a] | Run 2 | Run 3 | Run 4 |
| Ingredients | | | | |
| Polyethylene terephthalate[b], wt. %[c] | 35 | 35 | 35 | 49 |
| Glass Fiber[d], wt. % | 30 | 30 | 30 | 30 |
| 1/64" Glass Flakes[e], wt. % | 15 | 15 | 15 | 0 |
| Aliphatic Polyester[f] | 2.9 | 2.9 | 2.9 | 3.5 |
| Ionic Hydrocarbon Copolymer[g] | 0.4 | 0.4 | 0.4 | 0.5 |
| Antioxidant[h] | 0.4 | 0.4 | 0.4 | 0.5 |
| Brominated Polystyrene[i] | 11.2 | 11.2 | 11.2 | 14.4 |
| Sodium Antimonate[j] | 1.1 | 1.1 | 1.1 | 1.5 |
| Polyester Amide[k] | 0 | 0.2 | 0.4 | 0.5 |
| Sodium Stearate[l] | 0 | 0.1 | 0.1 | 0.1 |
| Color Concentrate[m] | 4 | 4 | 4 | |
| Physical Properties | | | | |
| Flex Modulus, MSI | 1.9 | 1.8 | 1.8 | 1.5 |
| Flex Strength, MSI | 23.6 | 22.3 | 23.2 | 27.6 |
| Tensile Break, KSI | 16.1 | 16.2 | 16.4 | 19.1 |
| Percent Elongation | 2.9 | 3.1 | 3.2 | 4.1 |
| Notched Izod, ft.lb./in. | 1.0 | 1.0 | 1.0 | 1.2 |
| Unnotched Izod, ft.lb./in. | 6.2 | 5.6 | 5.3 | |
| Melt Flow, 275° C., 5 kg | 46 | 39 | 39 | |
| Color | | | | tan |
| Surface | very slightly | very slightly | very slightly | glossy |

TABLE 3-continued

| Polyethylene Terephthalate Compounds with Flame Retardants | | | | |
|---|---|---|---|---|
| | Run 1[a] | Run 2 | Run 3 | Run 4 |
| | dull | dull | dull | |

Notes for Table 3
[a]Control run
[b]Polyethylene terephthalate resin having an inherent viscosity of about 0.6 was used.
[c]Weight percents are based on total weight of the compound.
[d]Glass fiber is Owens Corning 492AA.
[e]Glass flakes are commercially available from Nyco.
[f]Paraplex TM G-25, commercially available from C. P. Hall.
[g]Formion TM 105, commercially available from A. Schulman, Inc.
[h]Irganox TM 1010, a hindered phenol antioxidant commercially available from Ciba-Geigy Corporation.
[i]Pyro-Chek ® 68PB obtained from Ferro Corporation.
[j]Thermoguard TM FR obtained from Atochem, Inc.
[k]Polyester amide obtained from the Dow Chemical Company under the developmental number XUS 63115.
[l]Sodium stearate grade T-1 is available from the Humko Chemical Division of Witco Corporation.
[m]Custom blue color concentrate (CPET 00587) was obtained from Reed Plastics.

Table 3 shows a control run 1 with a combination of glass fiber and glass flakes, and a flame retardant package. Control run 1 does not have polyester amide and sodium stearate. Runs 1 and 2 have the same combination of glass fiber and glass flakes and flame retardant package with sodium stearate and differing amounts of polyester amide. Adding the sodium stearate and polyester amide did not compromise the physical properties of the compound. Having the flake glass reduces warpage of parts molded from the compound. It is believed that molding conditions such as temperature of the mold prevented gloss improvement in these two runs.

Run 4 on Table 3 shows use of a flame retardant in a compound without glass flakes and without the color concentrates results in good surface finish.

TABLE 4

| Polyethylene Terephthalate Compounds with Other Stearates | | | |
|---|---|---|---|
| | Run 1[a] | Run 2 | Run 3 |
| Ingredients | | | |
| Polyethylene Terephthalate[b], wt. %[c] | | 41.2 | 41.2 |
| Glass Fiber[d], wt. % | 55.0 | 55.0 | 55.0 |
| Aliphatic Polyester[e], wt. % | 2.9 | 2.9 | 2.9 |
| Ionic Hydrocarbon[f] Copolymer, wt. % | 0.2 | 0.2 | 0.2 |
| Antioxidant[g], wt. % | 0.2 | 0.2 | 0.2 |
| Polyester Amide[h], wt. % | 0.4 | 0.4 | 0.4 |
| Sodium Stearate, wt. % | 0.1 | 0 | 0 |
| Calcium Stearate, wt. % | 0 | 0.1 | 0 |
| Zinc Stearate, wt. % | 0 | 0 | 0.1 |
| Properties | | | |
| Flex Modulus, MSI | 2.7 | 2.5 | 2.5 |
| Flex Strength, KSI | 40.6 | 35.3 | 36.7 |
| Tensile Break, KSI | 27.0 | 25.8 | 25.5 |
| Percent Elongation | 3.4 | 3.3 | 3.3 |
| Color | lt. tan | lt. tan | lt. tan |
| Surface | glossy | glossy | very slightly dull |

Notes for Table 4
[a]Control run.
[b]Traytuf TM 5900 polyethylene terephthalate commercially available from Goodyear was used.
[c]Weight percents are based on total weight of the composition.
[d]Glass fiber commercially available from Certainteed as 993 glass.
[e]Paraplex TM G-25, commercially available from C. P. Hall.
[f]Formion TM 105, commercially available from A. Schulman, Inc.
[g]Irganox TM 1010, a hindered phenol antioxidant commercially available from Ciba-Geigy Corporation.
[h]Polyester amide XUS 63115, a developmental product available from Dow Chemical Company.

Runs 2 and 3 in Table 4 show that neither calcium stearate nor zinc stearate in the inventive quantities have the same effects as sodium stearate: the physical properties of the compound are compromised with the substitution of other stearates and surface finish is not improved by the use of zinc stearate.

TABLE 5

| Polyester Amides and Sodium Stearate in Polyethylene Terephthalate with Mica | | | | |
|---|---|---|---|---|
| | Run 1[a] | Run 2 | Run 3 | Run 4 |
| Ingredients | | | | |
| Polyethylene Terephthalate[b], wt. %[c] | 58.6 | 58.0 | 58.0 | 58.0 |
| Glass Fiber[d], wt. %[c] | 15.0 | 15.0 | 15.0 | 25.0 |
| Mica[e] | 20.0 | 20.0 | 20.0 | 10.0 |
| Aliphatic Polyester[f], wt. %[c] | 4.2 | 4.1 | 4.1 | 4.1 |
| Ionic Hydrocarbon Copolymer[g], wt. %[c] | 0.6 | 0.6 | 0.6 | 0.6 |
| Antioxidant[h], wt. %[c] | 0.6 | 0.6 | 0.6 | 0.6 |
| Polyester Amide[i], wt. %[c] | 0 | 0.6 | 0.6 | 0.6 |
| Sodium Stearate, wt. %[c] | 0 | 0.1 | 0.1 | 0.1 |
| Color Concentrate[j], wt. %[c] | 1.0 | 1.0 | 1.0 | 1.0 |
| Properties | | | | |
| Flex Modulus, MSI | 1.3 | 1.3 | 1.3 | 1.4 |
| Flex Strength, KSI | 20.2 | 20.1 | 19.7 | 26 |
| Tensile Break, KSI | 12.8 | 13.2 | 13.0 | 16.6 |
| Percent Elongation | 3.3 | 3.5 | 3.5 | 3.7 |
| Notched Izod, ft.lb./in. | 0.8 | 0.7 | 0.8 | 1.0 |
| Unnotched Izod, ft.lb./in. | 5.3 | 5.4 | 5.4 | 9.3 |
| Flow Rate, 275° C., 5 Kg | 64 | 66 | 69 | 58 |
| Spiral Flow, in @ | | | | |
| 6,750 PSI | 9 | 9.5 | 9.75 | 9.25 |
| 13,500 PSI | 13.5 | 14.5 | 14.25 | 13.75 |
| 20,250 PSI | 17 | 18.75 | 18.5 | 17 |
| Tg[k] | 79 | 77 | 79 | 78 |
| Tcc[k] | 125 | 123 | 124 | 123 |
| Tm[k] | 251 | 252 | 253 | 252 |
| Tmc[k] | 208 | 211 | 210 | 210 |
| Crystallization Window, % | 48 | 50 | 49 | 50 |
| Color | black | black | black | black |
| Surface | glossy | glossy | glossy | dull |

[a]Control run.
[b]Polyethylene terephthalate is Traytuf TM 5900 commercially available from Goodyear.
[c]Weight percents are based on total weight of the compound.
[d]Glass fiber is 993 commercially available from Certainteed.
[e]Mica is 40K Mica commercially available from KMG Minerals, Inc., Kings Mountain, N.C.
[f]Aliphatic polyester is Paraplex TM G-25 commercially available from C. P. Hall.
[g]Ionic hydrocarbon copolymer is Formion TM 105 commercially available from A. Schulman, Inc.
[h]Antioxidant is Irganox TM 1010 commercially available from Ciba-Geigy Corporation.
[i]Polyester amide is XUS 63115, a developmental product available from Dow Chemical Company
[j]21% carbon black color concentrate for polyethylene terephthalate, commercially available from Reed plastics as CPET 01333.
[k]°C. as measured by differential scanning calorimeter.

The runs in Table 5 show that the polyester amide/sodium stearate additive package can be successfully used in a polyethylene terephthalate compound with glass fiber and mica reinforcement.

In run 3 only the resin was vacuum dried prior to compounding. In runs 1, 2 and 4 both the mica and resin was vacuum dried before compounding. Run 3 thus demonstrates that it is not necessary to dry the mica prior to compounding. Increasing the glass to mica ratio improves the mechanical properties and heat distortion temperature. Having the mica in the compound reduces warpage of objects molded from the compound.

While the articles of manufacture, the processes and compositions of this invention have been described in detail for the purpose of illustration, the inventive articles, processes and compositions are not to be construed as limited thereby. This patent is intended to cover all changes and modifications within the spirit and scope thereof.

That which is claimed is:

1. A composition comprising:

(a) polyethylene terephthalate;
(b) filler;
(c) an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;
(d) a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;
(e) an antioxidant;
(f) sodium stearate;
(g) a polyester amide resin characterized by a recurring unit of the formula:

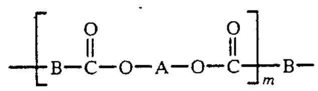

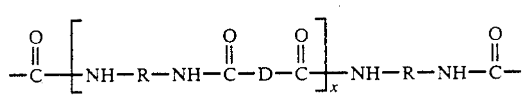

wherein R is selected from the class consisting of arylene of the formulae:

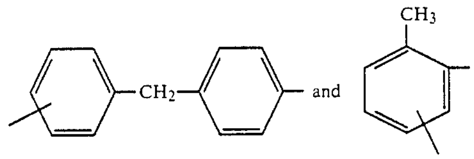

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10.

2. A composition comprising:
(a) from about 30 to about 90 weight percent, based on total weight of the composition, of polyethylene terephthalate having an inherent viscosity of at least about 0.25;
(b) from about 5 to about 65 weight percent, based on total weight of the composition, of glass fibers;
(c) from about 0.5 to about 15 pph resin of an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;
(d) from about 0.1 to about 3 pph resin of a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;
(e) from about 0.01 to about 2 pph resin of an antioxidant;
(f) from about 0.01 to about 1 pph resin of sodium stearate;
(g) from about 0.1 to about 5 pph resin of a polyester amide resin characterized by a recurring unit of the formula:

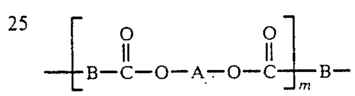

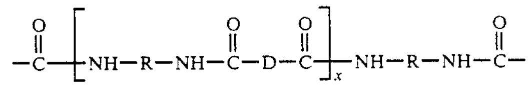

wherein R is selected from the class consisting of arylene of the formulae:

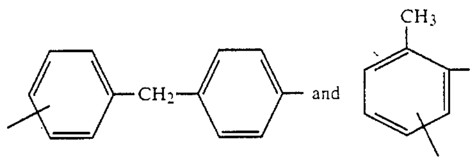

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10.

3. A composition as recited in claim 2 which additionally contains from greater than 0 to about 20 weight percent of a flame retardant.

4. A composition as recited in claim 3 wherein said flame retardant consists essentially of:
(a) brominated polystyrene having a molecular weight ranging from about 10,000 to about 400,000 and having a bromine content in the range of from about 55 to about 75 weight percent based on the total weight of said brominated polystyrene; and
(b) an antimonate of at least one metal selected from Groups I, II or VII of the Periodic Table, the weight ratio of said brominated polystyrene to said antimonate being in the range from about 2:1 to 12:1.

5. A composition as recited in claim 4 wherein said antimonate is selected from the group consisting of sodium antimonate, zinc antimonate, and nickel antimonate.

6. A composition as recited in claim 5 wherein said antimonate comprises sodium antimonate.

7. A composition as recited in claim 2 wherein said aliphatic polyester has a molecular weight in the range from about 8,000 to about 10,000 and comprises a condensation product of sebacic acid and 1,2-propanediol.

8. A composition as recited in claim 2 wherein said ionic hydrocarbon copolymer is comprised of ethylene and a carboxylic acid selected from the group consisting of acrylic acid, methacrylic acid, and mixtures thereof.

9. A composition as recited in claim 2 wherein said antioxidant is a hindered phenol.

10. A composition as recited in claim 3 wherein said aliphatic polyester has a molecular weight in the range from about 8,000 to about 10,000 and comprises a condensation product of sebacic acid and 1,2-propanediol.

11. A composition as recited in claim 3 wherein said ionic hydrocarbon copolymer is comprised of ethylene and a carboxylic acid selected from the group consisting of acrylic acid, methacrylic acid, and mixtures thereof.

12. A composition as recited in claim 3 wherein said antioxidant is a hindered phenol.

13. A composition comprising:

(a) polyethylene terephthalate;
(b) a filler comprising a mixture of flake glass and fiber glass;
(c) an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;
(d) a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;
(e) an antioxidant;
(f) sodium stearate;
(g) polyester amide resin characterized by a recurring unit of the formula:

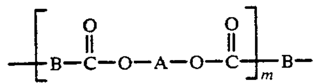

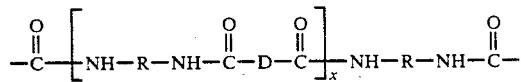

wherein R is selected from the class consisting of arylene of the formulae:

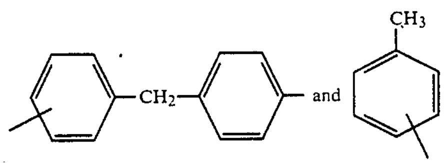

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10.

14. A composition comprising:

(a) from about 30 to about 90 weight percent based on total weight of the composition polyethylene terephthalate having an inherent viscosity of at least about 0.25;
(b) from about 5 to about 65 weight percent, based on total weight of the composition, of filler, said filler comprising a mixture of flake glass and fiber glass having a ratio of said flake glass to said fiber glass from about 10:1 to about 1:10;
(c) from about 0.5 to about 15 pph resin of an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;
(d) from about 0.1 to about 3 pph resin of a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;
(e) from about 0.01 to about 2 pph resin of an antioxidant;
(f) from about 0.01 to about 1 pph resin of sodium stearate;
(g) from about 0.1 to about 5 pph resin of a polyester amide resin chacterized by a recurring unit of the formula:

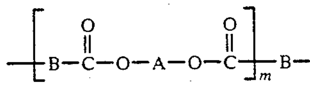

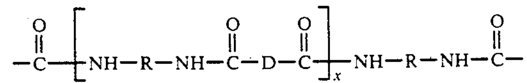

wherein R is selected from the class consisting of arylene of the formulae:

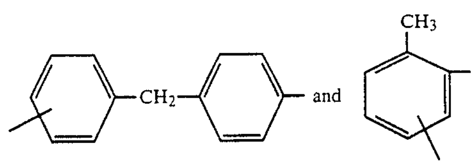

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10.

15. A composition as recited in claim 14 which additionally contains from about 1 to about 50 pph resin of a flame retardant.

16. A composition as recited in claim 15 wherein said flame retardant consists essentially of:

(a) brominated polystyrene having a molecular weight ranging from about 10,000 to about 400,000 and having a bromine content in the range of from about 55 to about 75 weight percent based on the total weight of said brominated polystyrene; and (b) an antimonate of at least one metal selected from Groups I, II or VII of the Periodic Table, the weight ratio of said brominated polystyrene to said antimonate being in the range from about 1:1 to 20:1.

17. A composition as recited in claim 14 wherein said aliphatic polyester has a molecular weight in the range from about 8,000 to about 10,000 and comprises a condensation product of sebacic acid and 1,2-propanediol.

18. A composition as recited in claim 14 wherein said ionic hydrocarbon copolymer is comprised of ethylene and a carboxylic acid selected from the group consisting of acrylic acid, methacrylic acid, and mixtures thereof.

19. A composition as recited in claim 14 wherein said antioxidant is a hindered phenol.

20. A composition as recited in claim 15 wherein said aliphatic polyester has a molecular weight in the range from about 8,000 to about 10,000 and comprises a condensation product of sebacic acid and 1,2-propanediol.

21. A composition as recited in claim 15 wherein said ionic hydrocarbon copolymer is comprised of ethylene and a carboxylic acid selected from the group consisting of acrylic acid, methacrylic acid, and mixtures thereof.

22. A composition as recited in claim 15 wherein said antioxidant is a hindered phenol.

23. A process for preparing a composition comprising:

(a) polyethylene terephthalate;

(b) glass;

(c) an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;

(d) a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;

(e) an antioxidant;

(f) sodium stearate;

(g) a polyester amide resin chacterized by a recurring unit of the formula:

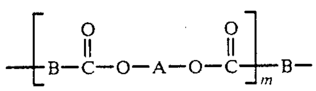

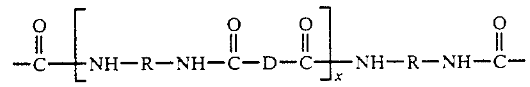

wherein R is selected from the class consisting of arylene of the formulae:

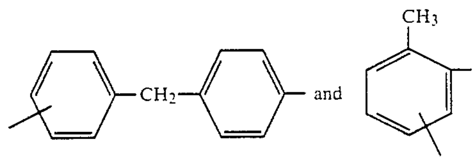

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10;

said process comprising mixing components (a) through (g) and melt extruding the mixture.

24. A process for preparing a composition comprising:

(a) from about 20 to about 90 weight percent based on total weight of the composition polyethylene terephthalate having an inherent viscosity of at least about 0.25;

(b) from about 5 to about 65 weight percent, based on total weight of the composition, of glass fibers;

(c) from about 0.5 to about 15 pph resin of an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;

(d) from about 0.1 to about 3 pph resin of a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;

(e) from about 0.01 to about 2 pph resin of an antioxidant;

(f) from about 0.01 to about 1 pph resin of sodium stearate;

(g) from about 0.1 to about 5 pph resin of a polyester amide resin characterized by a recurring unit of the formula:

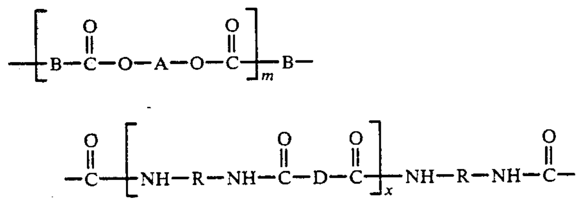

wherein R is selected from the class consisting of arylene of the formulae:

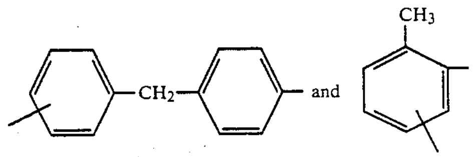

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10;

said process comprising mixing components (a) through (g) and melt extruding the mixture.

25. A process as recited in claim 24 wherein said polyethylene terephthalate is premixed with said glass fibers before the resulting mixture is admixed with the remaining components.

26. A process for preparing a composition comprising:

(a) polyethylene terephthalate;

(b) filler;

(c) an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;

(d) a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;

(e) an antioxidant;

(f) sodium stearate;

(g) a polyester amide resin chacterized by a recurring unit of the formula:

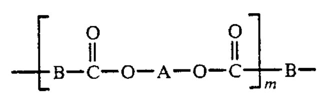

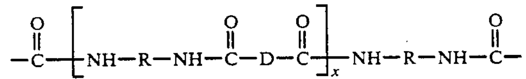

wherein R is selected from the class consisting of arylene of the formulae:

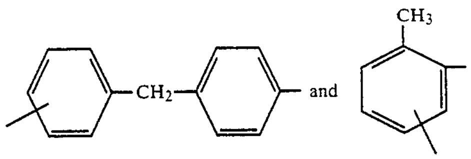

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, inclusive, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10; and (h) a flame retardant;

said process comprising mixing components (a) through (h) and melt extruding the mixture.

27. A process for preparing a composition comprising:

(a) from about 30 to about 75 weight percent based on total weight of the composition polyethylene terephthalate having an inherent viscosity of at least about 0.25;

(b) from about 5 to about 65 weight percent, based on total weight of the composition, of glass fibers;

(c) from about 0.5 to about 15 pph resin of an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;

(d) from about 0.1 to about 3 pph resin of a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;

(e) from about 0.01 to about 2 pph resin of an antioxidant;

(f) from about 0.01 to about 1 pph resin of sodium stearate;

(g) from about 0.1 to about 5 pph resin of a polyester amide resin chacterized by a recurring unit of the formula:

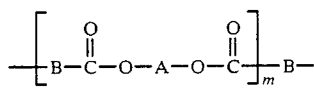

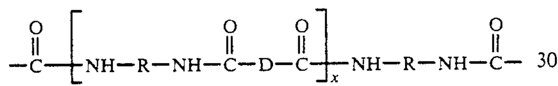

wherein R is selected from the class consisting of arylene of the formulae:

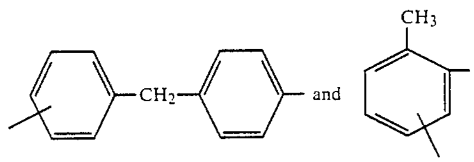

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10; and (h) from greater than 0 to about 20 weight percent based on total weight of the composition of a flame retardant;

said process comprising mixing components (a) through (h) and melt extruding the mixture.

28. A process as recited in claim 27 wherein said aliphatic polyester is premixed with said glass fibers before the resulting mixture is admixed with the remaining components.

29. A process for preparing a composition comprising:

(a) polyethylene terephthalate;

(b) a filler comprising a mixture of flake glass and fiber glass;

(c) an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;

(d) a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;

(e) an antioxidant;

(f) sodium stearate;

(g) a polyester amide resin chacterized by a recurring unit of the formula:

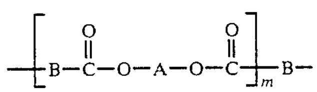

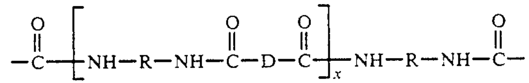

wherein R is selected from the class consisting of arylene of the formulae:

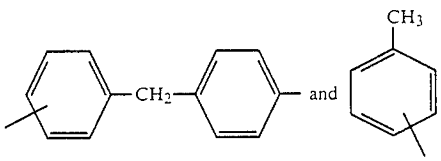

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10;

said process comprising mixing components (a) through (g) and melt extruding the mixture.

30. A process for preparing a composition comprising:

(a) from about 30 to about 90 weight percent based on total weight of the composition polyethylene terephthalate having an inherent viscosity of at least about 0.25;

(b) from about 5 to about 65 weight percent, based on total weight of the composition, of filler, said filler comprising a mixture of flake glass and fiber glass having a ratio of said flake glass to said fiber glass from about 10:1 to about 1:10;

(c) from about 0.5 to about 15 pph resin of an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;

(d) from about 0.1 to about 3 pph resin of a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;

(e) from about 0.01 to about 2 pph resin of an antioxidant;

(f) from about 0.01 to about 1 pph resin of sodium stearate; and (g) from about 0.1 to about 5 pph resin of a polyester amide resin characterized by a recurring unit of the formula:

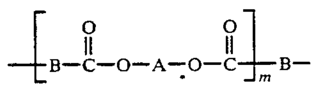

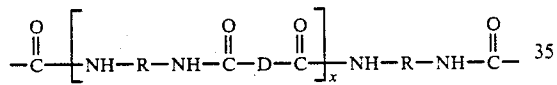

wherein R is selected from the class consisting of arylene of the formulae:

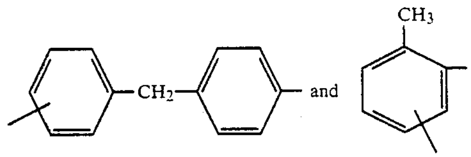

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10; and said process comprising mixing components (a) through (g) and melt extruding the mixture.

31. A process for preparing a composition comprising:

(a) polyethylene terephthalate;

(b) a filler comprising a mixture of flake glass and fiber glass;

(c) an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;

(d) a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;

(e) an antioxidant;

(f) sodium stearate;

(g) a polyester amide resin characterized by a recurring unit of the formula:

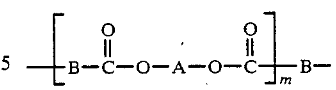

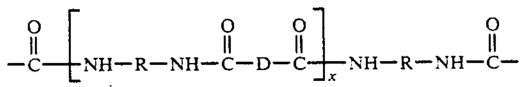

wherein R is selected from the class consisting of arylene of the formulae:

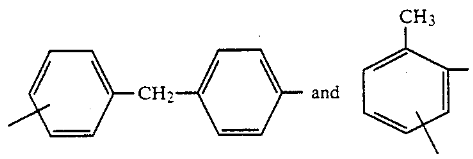

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segement thereof is not greater than 280° C., and x is a number having an average value from zero to 10; and (h) a flame retardant;

said process comprising mixing components (a) through (h) and melt extruding the mixture.

32. A process for preparing a composition comprising:

(a) from about 30 to about 90 weight percent based on total weight of the composition polyethylene terephthalate having an inherent viscosity of at least about 0.25;

(b) from about 5 to about 65 weight percent, based on total weight of the composition, of filler, said filler comprising a mixture of flake glass and fiber glass having a ratio of said flake glass to said fiber glass from about 10:1 to about 1:10;

(c) from about 0.5 to about 15 pph resin of an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;

(d) from about 0.1 to about 3 pph resin of a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;

(e) from about 0.01 to about 2 pph resin of an antioxidant;

(f) from about 0.01 to about 1 pph resin of sodium stearate;

(g) from about 0.1 to about 5 pph resin of a polyester amide resin characterized by a recurring unit of the formula:

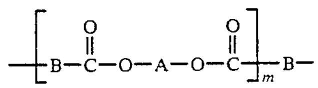

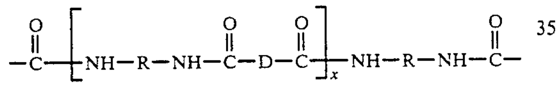

wherein R is selected from the class consisting of arylene of the formulae:

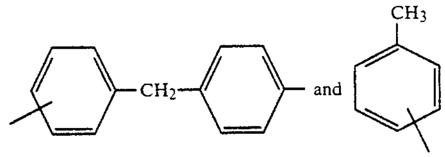

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10; and (h) from greater than 0 to about 20 weight percent based on total weight of the composition of a flame retardant;

said process comprising mixing components (a) through (h) and melt extruding the mixture.

33. A process for making a molded article which comprises injecting into a mold a composition comprising:

(a) polyethylene terephthalate;

(b) filler;

(c) an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;

(d) a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;

(e) an antioxidant;

(f) sodium stearate;

(g) a polyester amide resin characterized by a recurring unit of the formula:

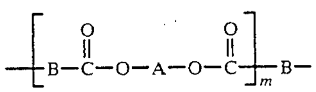

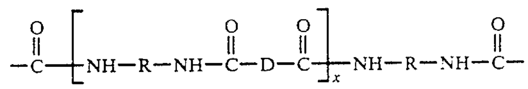

wherein R is selected from the class consisting of arylene of the formulae:

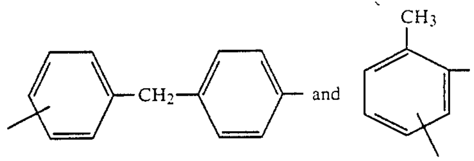

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10.

34. A process for making a molded article which comprises injecting into a mold a composition comprising:

(a) from about 30 to about 75 weight percent based on total weight of the composition polyethylene terephthalate having an inherent viscosity of at least about 0.25;

(b) from about 5 to about 65 weight percent, based on total weight of the composition, of glass fibers;

(c) from about 0.5 to about 15 pph resin of an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;

(d) from about 0.1 to about 3 pph resin of a metal salt of an ionic hydrocarbon copolymer of an alpha-olefin containing from 2 to about 5 carbon atoms per molecule and an alpha, beta-ethylenically unstaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;

(e) from about 0.01 to about 2 pph resin of an antioxidant;

(f) from about 0.01 to about 1 pph resin of sodium stearate;

(g) from about 0.1 to about 5 pph resin of a polyester amide resin characterized by a recurring unit of the formula:

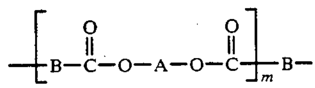

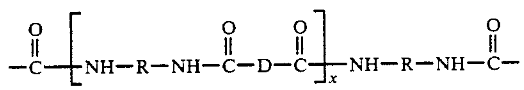

wherein R is selected from the class consisting of arylene of the formulae:

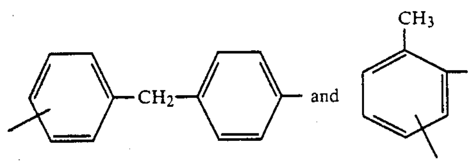

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10.

35. A process for making a molded article which comprises injecting into a mold a composition comprising:

(a) polyethylene terephthalate;

(b) filler;

(c) an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;

(d) a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;

(e) an antioxidant;

(f) sodium stearate;

(g) a polyester amide resin characterized by a recurring unit of the formula:

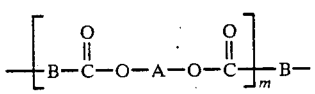

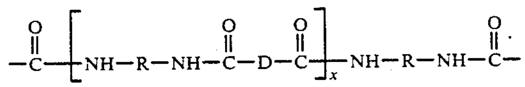

wherein R is selected from the class consisting of arylene of the formulae:

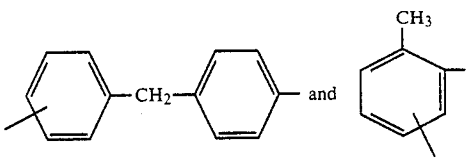

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephathalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10; and (h) a flame retardant.

36. A process for making a molded article which comprises injecting into a mold a composition comprising:

(a) from about 30 to about 75 weight percent based on total weight of the composition polyethylene terephthalate having an inherent viscosity of at least about 0.25;

(b) from about 5 to about 65 weight percent, based on total weight of the composition, of glass fibers;

(c) from about 0.5 to about 15 pph resin of an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;

(d) from about 0.1 to about 3 pph resin of a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;

(e) from about 0.01 to about 2 pph resin of an antioxidant;

(f) from about 0.01 to about 1 pph resin of sodium stearate;

(g) from about 0.1 to about 5 pph resin of a polyester amide resin characterized by a recurring unit of the formula:

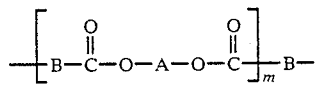

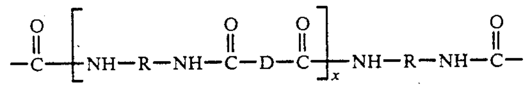

wherein R is selected from the class consisting of arylene of the formulae:

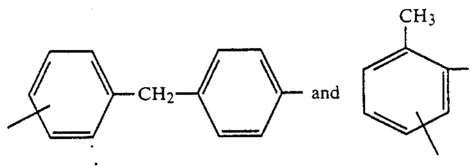

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10; and (h) from greater than 0 to about 20 percent of a flame retardant.

37. A process for making a molded article which comprises injecting into a mold a composition comprising:

(a) polyethylene terephthalate;

(b) a filler comprising a mixture of flake glass and fiber glass;

(c) an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;

(d) a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;

(e) an antioxidant;

(f) sodium stearate;

(g) a polyester amide resin characterized by a recurring unit of the formula:

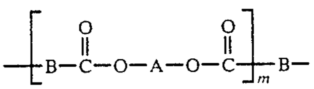

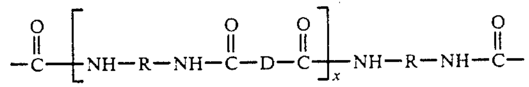

wherein R is selected from the class consisting of arylene of the formulae:

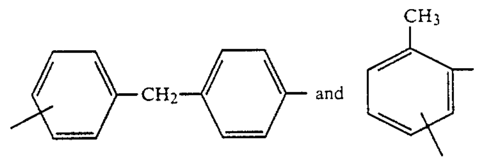

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10.

38. A process for making a molded article which comprises injecting into a mold a composition comprising:

(a) from about 30 to about 90 weight percent based on total weight of the composition polyethylene terephthalate having an inherent viscosity of at least about 0.25;

(b) from about 5 to about 65 weight percent, based on total weight of the composition, of filler, said filler comprising a mixture of flake glass and fiber glass having a ratio of said flake glass to said fiber glass from about 10:1 to about 1:10;

(c) from about 0.5 to about 15 pph resin of an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;

(d) from about 0.1 to about 3 pph resin of a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;

(e) from about 0.01 to about 2 pph resin of an antioxidant;

(f) from about 0.01 to about 1 pph resin of sodium stearate;

(g) from about 0.1 to about 5 pph resin of a polyester amide resin characterized by a recurring unit of the formula:

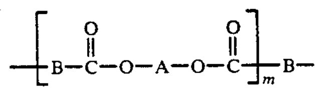

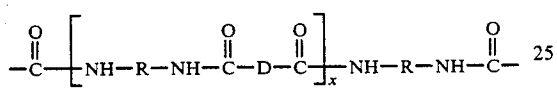

wherein R is selected from the class consisting of arylene of the formulae:

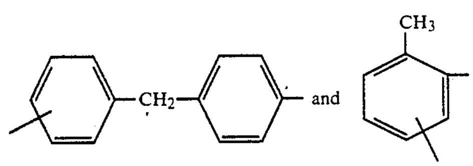

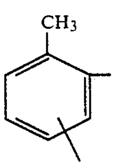

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10.

39. A process for making a molded article which comprises injecting into a mold a composition comprising:

(a) polyethylene terephthalate;

(b) a filler comprising a mixture of flake glass and fiber glass;

(c) an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;

(d) a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;

(e) an antioxidant;

(f) sodium stearate;

(g) a polyester amide resin characterized by a recurring unit of the formula:

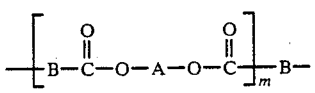

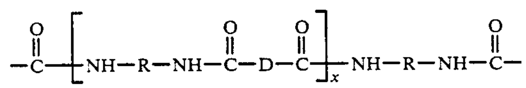

wherein R is selected from the class consisting of arylene of the formulae:

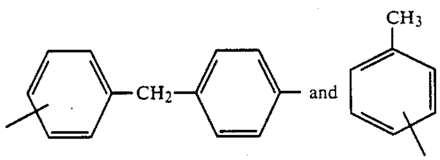

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, inclusive, isophthalic and terephthalic acids, m has a mean value of less than 1 and greater than 0, D is the residue of a dicarboxylic acid HOOC—D—COOH such that the melt temperature of the hard segment is not greater than 280° C., and x is a number having an average value from zero to 10; and (h) a flame retardant.

40. A process for making a molded article which comprises injecting into a mold a composition comprising:

(a) from about 30 to about 90 weight percent based on total weight of the composition polyethylene terephthalate having an inherent viscosity of at least about 0.25;

(b) from about 5 to about 65 weight percent, based on total weight of the composition, of filler, said filler comprising a mixture of flake glass and fiber glass having a ratio of said flake glass to said fiber glass from about 10:1 to about 1:10;

(c) from about 0.5 to about 15 pph resin of an aliphatic polyester having a number average molecular weight in the range from about 7,500 to about 20,000 and which is a condensation product of an alkanedioic acid containing from about 8 to 12 carbon atoms per molecule and an alkanediol containing from 2 to about 5 carbon atoms per molecule;

(d) from about 0.1 to about 3 pph resin of a metal salt of an ionic hydrocarbon copolymer of an alpha-olefin containing from 2 to about 5 carbon atoms per molecule and an alpha, beta-ethylenically unsaturated carboxylic acid containing from about 3 to about 5 carbon atoms per molecule in which copolymer the carboxyl groups have been at least partially neutralized with cations of said metal, said copolymer having a number average molecular weight in excess of about 3,000 prior to neutralization, said metal being selected from the group consisting of sodium and potassium;

(e) from about 0.01 to about 2 pph resin of an antioxidant;

(f) from about 0.01 to about 1 pph resin of sodium stearate;

(g) from about 0.1 to about 5 pph resin of a polyester amide resin characterized by a recurring unit of the formula:

$$-\left[B-\overset{\overset{O}{\|}}{C}-O-A-O-\overset{\overset{O}{\|}}{C}\right]_m B-$$

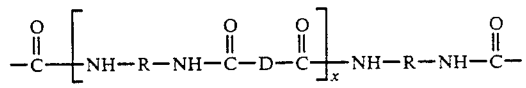

wherein R is selected from the class consisting of arylene of the formulae:

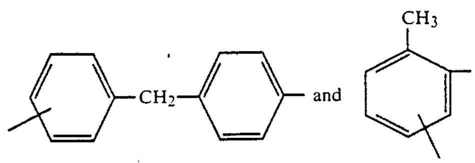

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, isophthalic and terephthalic acids, m has a mean value of less than 1 and greater than 0, D is the residue of a dicarboxylic acid HOOC—D—COOH such that the melt temperature of a hard segment thereof is not greater than 280° C., and x is a number having an average value from zero to 10; and (h) from greater than 0 to about 20 percent of a flame retardant.

41. A molded article produced by the process of claim 33.

42. A molded article produced by the process of claim 35.

43. A molded article produced by the process of claim 37.

44. A molded article produced by the process of claim 39.

* * * * *